(12) United States Patent
Peru

(10) Patent No.: US 11,186,325 B2
(45) Date of Patent: Nov. 30, 2021

(54) REAR PART OF A VEHICLE SUITABLE FOR ABSORBING A REAR IMPACT THAT COMPRISES A WELL IN WHICH A SPARE WHEEL IS SECURED

(71) Applicant: PSA AUTOMOBILES SA, Poissy (FR)

(72) Inventor: Marc Peru, Chatenay-Malabry (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/651,108

(22) PCT Filed: Sep. 24, 2018

(86) PCT No.: PCT/FR2018/052341
§ 371 (c)(1),
(2) Date: Mar. 26, 2020

(87) PCT Pub. No.: WO2019/068986
PCT Pub. Date: Apr. 11, 2019

(65) Prior Publication Data
US 2020/0223499 A1    Jul. 16, 2020

(30) Foreign Application Priority Data

Oct. 6, 2017   (FR) ...................................... 1759398

(51) Int. Cl.
*B62D 43/10*          (2006.01)
(52) U.S. Cl.
CPC .................................... *B62D 43/10* (2013.01)
(58) Field of Classification Search
CPC .... B62D 21/152; B62D 43/10; B62D 25/087; B62D 25/2027; B62D 25/08; B62D 43/06
(Continued)

(56) References Cited

U.S. PATENT DOCUMENTS 3,642,296 A * 2/1972 Froumajou .......... B60K 15/063
280/834
6,231,097 B1   5/2001 Schell et al.
(Continued)

FOREIGN PATENT DOCUMENTS

FR         2925461 A1    6/2009
JP       S60149478 U    10/1985
(Continued)

OTHER PUBLICATIONS

International Search Report for PCT/FR2018/052341 dated Jan. 22, 2019.
Written Opinion for PCT/FR2018/052341 dated Jan. 22, 2019.

*Primary Examiner* — D Glenn Dayoan
*Assistant Examiner* — Sunsurraye Westbrook
(74) *Attorney, Agent, or Firm* — Sandberg Phoenix & von Gontard, P.C.

(57) ABSTRACT

The invention concerns a rear part (4) of a vehicle (1) that comprises a rear structure (41) and a spare wheel (3), the rear structure (41) comprising a luggage compartment floor (43) in which a well (44) is formed in order for said spare wheel (3) to be positioned therein, the well (44) comprising a bottom (47) and at least one first wall positioned facing the spare wheel (3) and forming a rear wall or one of the two side walls of the well, the bottom of the well comprising attachment means (6) for securing the spare wheel (3) thereto, the well (44) comprising control means (7) positioned between said first wall (45) and the attachment means (6), said control means (7) being suitable for releasing the spare wheel (3) from the bottom (47) of the well (44) in the event of an impact against said rear part (4) of the vehicle, on the side of the first wall (45) of the well (44), in alignment with the control means (7).

11 Claims, 2 Drawing Sheets

(58) Field of Classification Search
USPC ..... 296/37.2, 193.8, 187.11, 187.08, 203.04, 296/37
See application file for complete search history.

(56) References Cited

U.S. PATENT DOCUMENTS

| | | | |
|---|---|---|---|
| 6,672,639 B2 * | 1/2004 | Kosuge | B62D 43/10 296/187.11 |
| 7,270,365 B2 * | 9/2007 | Suzuki | B62D 25/087 296/187.08 |
| 7,469,950 B2 * | 12/2008 | Cox | B62D 25/2027 296/204 |
| 2007/0096488 A1 | 5/2007 | Suzuki et al. | |
| 2009/0195030 A1 | 8/2009 | Yamaguchi et al. | |
| 2010/0225135 A1 | 9/2010 | Taneda | |
| 2017/0029046 A1 | 2/2017 | Shimpo | |

FOREIGN PATENT DOCUMENTS

| | | |
|---|---|---|
| JP | S6239376 A | 2/1987 |
| JP | H0735261 U | 6/1995 |
| JP | 2004181998 A | 7/2004 |

* cited by examiner

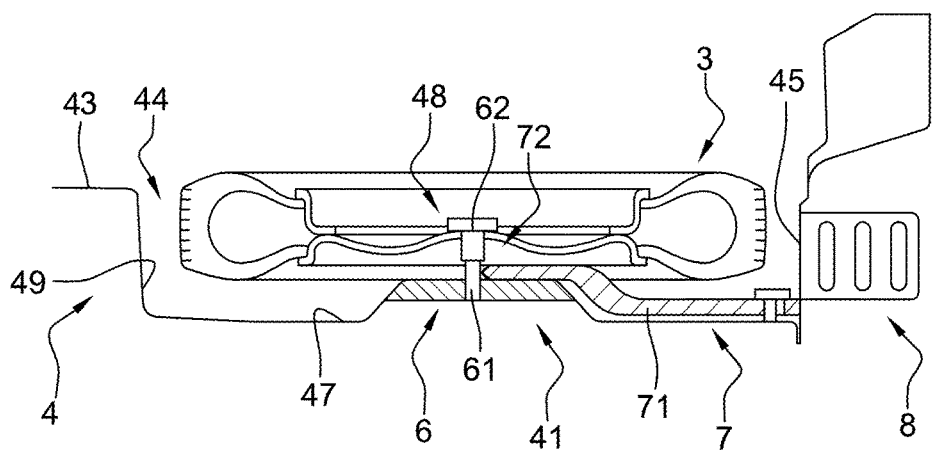
Fig. 3
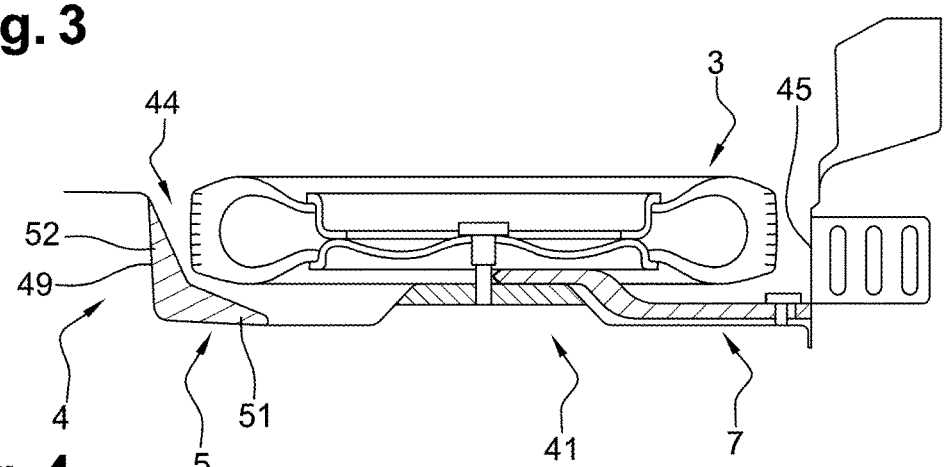
Fig. 4
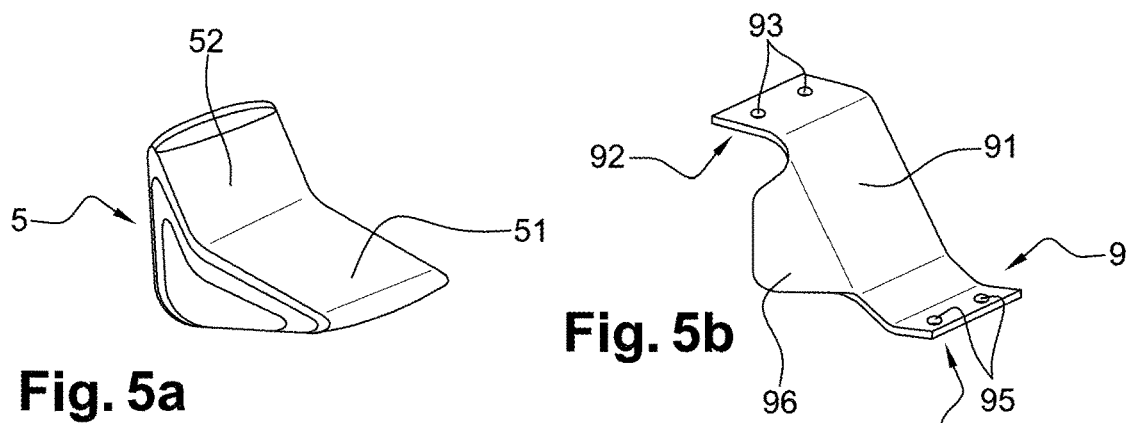
Fig. 5a
Fig. 5b
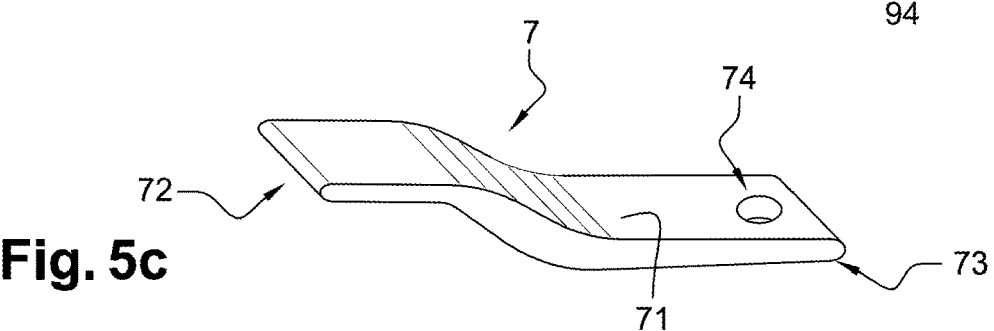
Fig. 5c

REAR PART OF A VEHICLE SUITABLE FOR ABSORBING A REAR IMPACT THAT COMPRISES A WELL IN WHICH A SPARE WHEEL IS SECURED

CROSS-REFERENCE TO RELATED APPLICATIONS

This application is the US National Stage under 35 USC § 371 of International Application No. PCT/FR2018/052341, filed 24 Sep. 2018 which claims priority to French Application No. 1759398 filed 6 Oct. 2017, both of which are incorporated herein by reference.

BACKGROUND

The present application relates to a rear part of a vehicle that comprises a rear structure and a spare wheel.

The present application, in particular, relates mainly to a rear structure that comprises a luggage compartment floor in which a well is formed in order for the spare wheel to be positioned therein. The well comprises a bottom that includes attachment means for securing the spare wheel in the well. The rear structure is adapted to allow the spare wheel to at least partly exit the well in the event of an impact against the rear part of the vehicle.

Certain national regulations that concern vehicle safety stipulate resistance conditions of the vehicles to a series of impacts. This is particularly the case with rear impacts at high speeds (in the order of 80 km/h) in the United States of America. For rear impact, this regulation is the strictest in the world and, as shown in FIG. 1, involves a vehicle 1 that is immobilized and against which is propelled, in a longitudinal direction X of the vehicle 1, a barrier 2. The barrier 2 comprises a partly deformable main body 21 and a partly prominent part 22 that simulates a bumper and is extremely rigid. In this figure, the axis Y represents a transverse direction of the vehicle 1 and the axis Z a vertical direction of the vehicle 1.

FIG. 2 shows a partial view, in perspective, of a rear part 11 of the vehicle, having a luggage compartment floor 111 in which a well 112 is formed and a spare wheel 3 is positioned in the well 112. The rear part also comprises a rear seat 113 positioned at the front part of the luggage compartment floor 111 and a rear reinforcement 114 forming a loading sill of the luggage compartment. In the event of a rear impact as previously seen in FIG. 1, the barrier 2 strikes the rear part of the vehicle 11 at great speed. The spare wheel 3 is then usually jammed between a vertical front wall of the well 112 and the rear reinforcement 114, which is pushed forward by the barrier 2. The presence of the spare wheel 3 does not allow the rear part 11 of the vehicle to deform in order to absorb part of the energy due to the impact. The energy due to the impact is then transmitted forward of the rear structure, onto the rear seat 113. Such a transmission of the energy due to the impact is unsatisfactory and even very dangerous for the vehicle's passengers.

SUMMARY

An object is to overcome these problems and, to this end, what is proposed is a rear part of a vehicle that comprises a rear structure and a spare wheel that, in the event of a high speed rear impact, ensures that the energy due to the impact can be at least partly absorbed by the deformation of the rear structure without the spare wheel forming an obstacle to this deformation.

More particularly, disclosed is a rear part of a vehicle that comprises a rear structure and a spare wheel, the rear structure comprising a luggage compartment floor in which a well is formed which receives the spare wheel, the well comprising a bottom and at least one first wall positioned facing the spare wheel and forming a rear wall or one of two side walls of the well, the bottom of the well comprising attachment means for securing the spare wheel thereto. The well further comprises control means positioned between the first wall and the attachment means, the control means being suitable for releasing the spare wheel from the bottom of the well in the event of an impact against the rear part of the vehicle, on the side of the first wall of the well, in alignment with the control means.

According to a first characteristic the control means comprise a sharp end positioned facing the attachment means which is suitable for cutting the attachment means in the event of an impact. The attachment means comprises a screw secured to the bottom of the well, the sharp end of the control means being suitable for cutting the screw in the event of an impact.

According to a second characteristic, the rear structure comprises a reinforcement positioned on the outside of the well, as an extension of the control means, to ensure that the control means is activated as soon as the impact begins, thus optimizing the deformation of the rear part of the vehicle.

According to a third characteristic, the well can also comprise at least one second vertical wall positioned on the side opposite the first wall and a wedge positioned along the second wall, the wedge comprising an inclined wall suitable for forming a ramp to enable the spare wheel to at least partly exit the well in the event of the impact. The wedge usually extends up the entire height of the second wall and is partly positioned beneath the spare wheel.

According to a first embodiment, the wedge is formed from a plastic material such as a dense foam or composite material. According to a second embodiment, the wedge can be formed from metal. A wedge made of a plastic material such as a dense foam or a composite material can be positioned between the first wall and the spare wheel without being secured in place. A wedge made of metal is preferably secured to the rear structure of the vehicle.

Lastly, an object is to provide a vehicle that comprises a rear part that includes at least one of the preceding characteristics.

DESCRIPTION OF THE FIGURES

Further subject matter, characteristics and advantages will emerge more clearly from the following description and with the aid of the accompanying drawings, provided purely for illustration purposes and by way of non-limiting examples, in which:

FIG. 3 shows a cross-sectional view of a well that comprises attachment means of the spare wheel on the bottom of the well and control means to release the spare wheel from the attachment means;

FIG. 4 shows a cross-sectional view of a well formed in a rear structure of a vehicle in which a spare wheel is positioned and which also comprises a wedge according to a first embodiment;

FIGS. 5*a* and 5*b* show perspective views of first and second embodiments, respectively, of the wedge and, FIG. 5*c* shows a perspective view of the control means.

DETAILED DESCRIPTION

In this description, a frame of reference associated with the normal direction of travel of a vehicle is used. The term front designates a position towards the front of the vehicle and the term rear designates a position towards the rear of the vehicle. The longitudinal axis corresponds to the normal axis of travel of the vehicle and the transverse axis refers to an axis perpendicular to the longitudinal axis within the vehicle's plane of movement.

Figure 1:
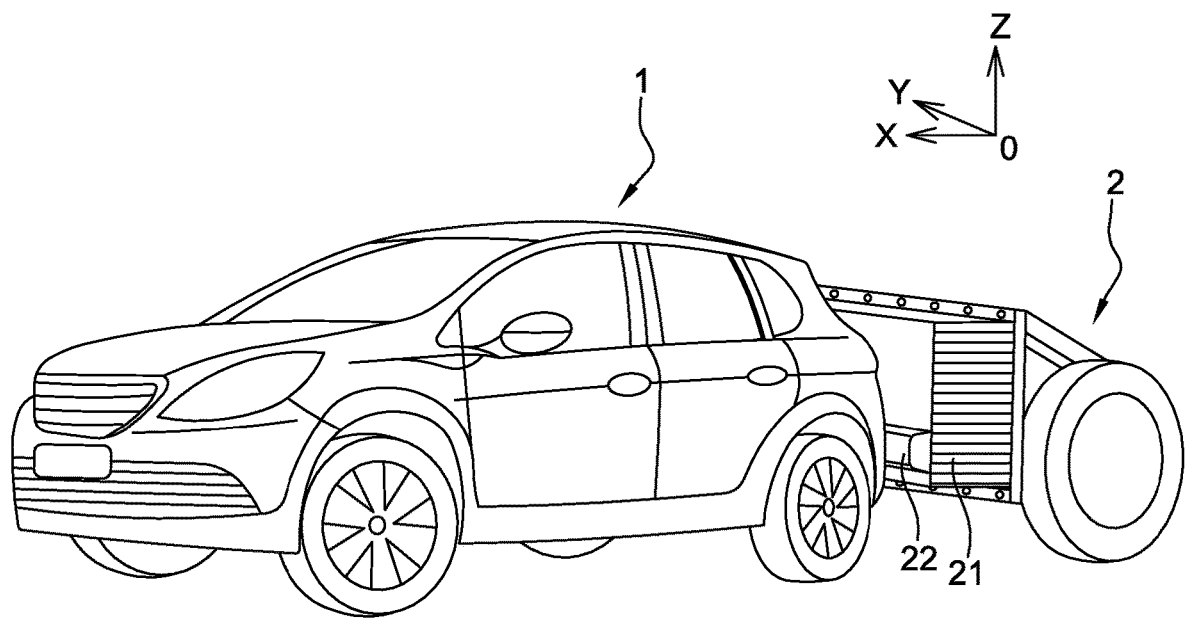
FIG. 1 shows a vehicle and a mobile barrier to simulate a rear impact in the context of a measurement of the resistance of the vehicle to a rear impact.
Figure 2:
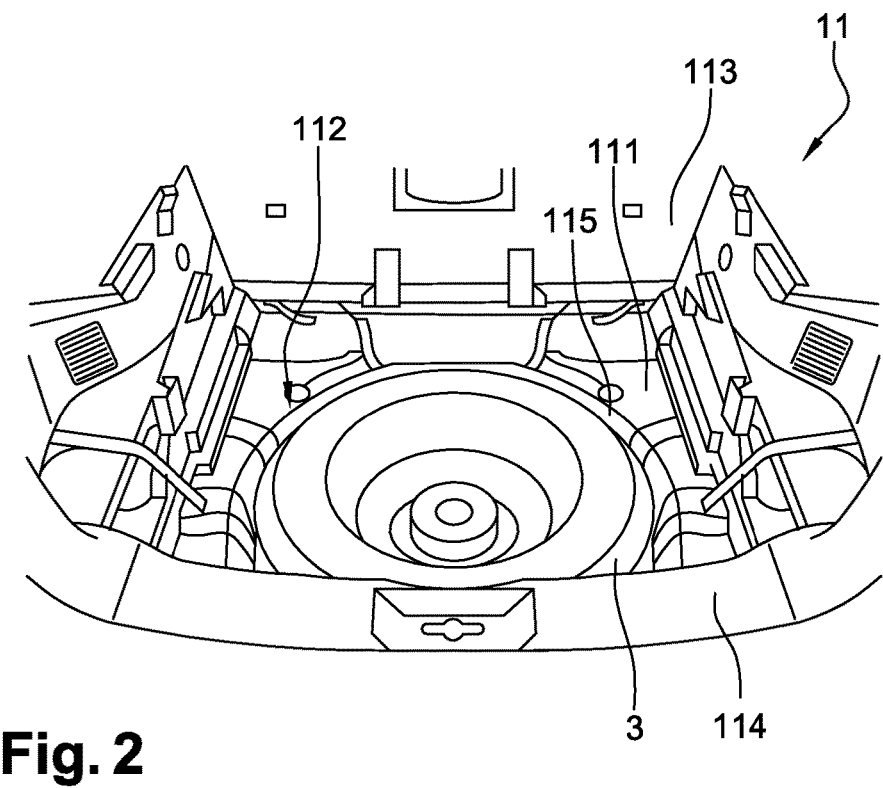
FIG. 2 shows a rear part of a vehicle, according to the prior art, that comprises a rear structure and a spare wheel placed in a well formed in the rear structure.

FIGS. 1 and 2 have already been described above. The common parts between the rear structure according to the state of the art and the rear structure according to the invention will bear the same reference numerals.

FIG. 3 shows a cross-sectional view of a rear part 4 of a vehicle that comprises a rear structure 41 and a spare wheel 3. The rear structure 41 comprises a luggage compartment floor 43 in which a well 44 is formed. The well 44 is formed in order for the spare wheel 3 to be positioned therein. The well 44 comprises a first vertical wall 45 positioned facing the spare wheel 3. In this first embodiment, the first wall 45 is positioned behind the spare wheel 3, constituting the rear wall 45 of the well 44. The spare wheel 3 is secured by attachment means 6 on the bottom 47 of the well 44. In this case, the attachment means 6 of the spare wheel 3 on the bottom 47 of the well 44 is formed by a post 61, such as a screw, secured to the bottom 47, which extends through a central opening 48 in the spare wheel 3 and by a nut 62 that is screwed onto the screw 61 and rests against the spare wheel 3, around the periphery of its central opening 48. The well 44 also comprises control means 7 that is positioned between the rear wall 45 of the well 44 and the screw 61. The control means 7 is suitable for releasing the spare wheel 3 from the bottom 47 of the well 44 in the event of an impact against the rear structure 41 of the vehicle, in alignment with the control means 7. The control means 7 comprises a linear part 71 that comprises a sharp end 72 positioned facing the screw 61 of the attachment means 6. The sharp end 72 is suitable for cutting the screw 61 in the event of an impact. To ensure that the control means 7 is properly guided from the start of the rear impact, the rear structure comprises a reinforcement 8 that is positioned outside the well 44, as a rear extension of the control means 7. The reinforcement 8 is designed so as to be crushed in the event of a rear impact, also helping to absorb part of the rear impact. The control means 7 and the reinforcement 8 are usually positioned in longitudinal alignment with the screw 61 of the attachment means 6.

FIG. 4 shows a cross-sectional view of the rear part 4 of the vehicle that additionally comprises a wedge 5. The well 44 comprises a second vertical wall 49 positioned facing the spare wheel 3. The second wall 49, which is positioned in front of the spare wheel 3, constitutes the front wall 49 of the well 44. The wall 49 is positioned substantially symmetrical to the rear wall 45, on the side opposite the spare wheel 3. The wedge 5 comprises an inclined wall suitable for forming a ramp to enable the spare wheel 3 to at least partly exit the well 44 in the event of an impact against the rear structure 41 of the vehicle, in alignment with the control means 7. In the embodiment shown, the wedge 5 comprises two parts with two different inclinations. A first part 51 that is positioned partly beneath the spare wheel 3 and has a steep inclination in relation to the front wall 49 and a second part 52 that is less inclined and extends to the top of the front wall 49. This double inclination is due to the fact that the space available between the front wall 49 and the spare wheel 3 is small, requiring the wedge to be of a suitable shape to better guide the spare wheel 3 out of the well 44 in the event of a rear impact. Moreover, the fact that the first part 51 of the wedge 5 is positioned at least partly beneath the spare wheel 3, allows the spare wheel 3 to exert a bearing pressure on the upper wall of the first part 51 of the wedge 5, allowing the wedge 5 to be held in position without the need to secure it in the well 44. In this embodiment, the wedge 5 is formed from a plastic material such as a dense foam.

FIGS. 5*a-c* show perspective views of two embodiments of the wedge 5 and a perspective view of the control means.

FIG. 5*a* shows the first embodiment of the wedge 5 with the first part 51 that has a first inclination of its upper wall and with the second part 52 that has a second inclination of its upper wall, both upper walls forming a ramp for the spare wheel. Such a wedge 5 can be formed from a plastic material such as a dense foam or from a composite material.

FIG. 5*b* shows a second embodiment of a wedge 9 that is formed from sheet metal and shaped by bending. Such a metal wedge 9 is suitable for being secured to the rear structure forming a ramp 91 with a first end 92 of the ramp 91 that is designed to be secured to the edge of the well, on the luggage compartment floor, by two first welding points 93 and a second end 94 of the ramp 91 that is designed to be secured to the bottom of the well, by two second welding points 95. The wedge 9 also comprises two flaps 96, positioned on either side of the ramp 91, that form stiffening elements for the ramp 91.

FIG. 5*c* shows the control means 7 that comprise a linear part 71 that comprises a sharp end 72 designed to be positioned facing the screw of the attachment means and a second end 73 that is suitable to serve as a thruster in the event of an impact. The second end 73 of the control means can be secured to the bottom of the well via an oblong opening 74 in which a securing screw can be positioned.

It goes without saying that the present invention is not limited to the embodiments just described and that various simple modifications and variations can be envisioned by a person skilled in the art without departing from the scope of the invention as defined by the accompanying claims, particularly by the fact that the wedge can also be positioned along another wall of the well. The same applies to the control means, which can also be positioned along a transverse axis of the vehicle, between a lateral wall of the well and the securing screw of the spare wheel.

The invention claimed is:

1. A rear part of a vehicle comprising a rear structure and a spare wheel, the rear structure comprising a luggage compartment floor and a well formed in said floor which receives the spare wheel, the well comprising a bottom and at least one first wall positioned facing the spare wheel and forming a wall of the well, a post extending upwardly from the bottom of the well, said post being adapted to secure the spare wheel in said well, and control means positioned between said at least one first wall and the post, said control means being suitable adapted to cut the post so as to release the spare wheel from the bottom of the well in the event of an impact against said rear part of the vehicle, said control means being positioned on the side of the first wall of the well and in alignment with the control means.

2. The rear part of a vehicle according to claim 1, wherein the control means comprises a sharp end positioned facing the attachment means and suitable for cutting said post in the event of said impact.

3. The rear part of a vehicle according to claim 2, wherein the post comprises a screw secured to the bottom of the well, the sharp end of the control means being suitable for cutting said screw in the event of the impact.

4. The rear part of a vehicle according to claim 1, wherein the rear structure comprises a reinforcement positioned on the outside of the well, said reinforcement being aligned with said control means to define an extension of the control means.

5. The rear part of a vehicle according to claim 1, wherein the well comprises at least one second vertical wall positioned on the side opposite said first wall and a wedge positioned along said second wall, said wedge comprising an inclined wall suitable for forming a ramp to enable the spare wheel to at least partly exit the well in the event of said impact.

6. The rear part of a vehicle according to claim 5, wherein the wedge extends the entire height of the second wall.

7. The rear part of a vehicle according to claim 5, wherein the wedge is partly positioned beneath the spare wheel.

8. The rear part of a vehicle according to claim 5, wherein the wedge is formed from a plastic material.

9. The rear part of a vehicle according to claim 5, wherein the wedge is formed from metal and is secured to said rear structure.

10. A vehicle comprising the rear part according to claim 1.

11. The rear part of a vehicle according to claim 8, wherein the wedges is formed from as a dense foam or from a composite material.

* * * * *